W. U. GRIFFITHS.
CEILING BEND FOR SUPPORTING PIPES.
APPLICATION FILED MAY 17, 1907.
967,902.
Patented Aug. 23, 1910.
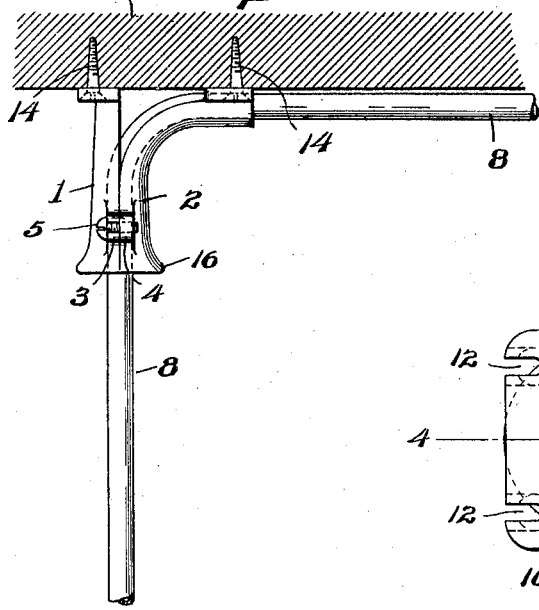
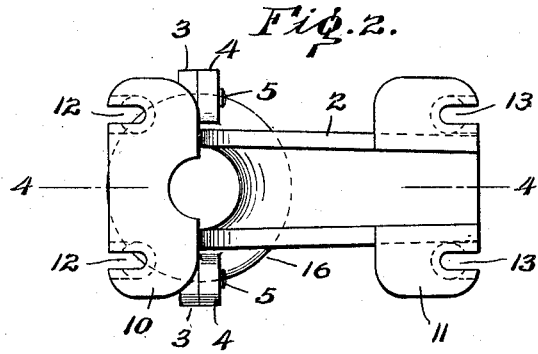
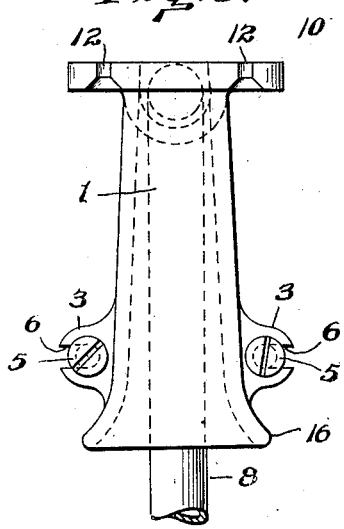
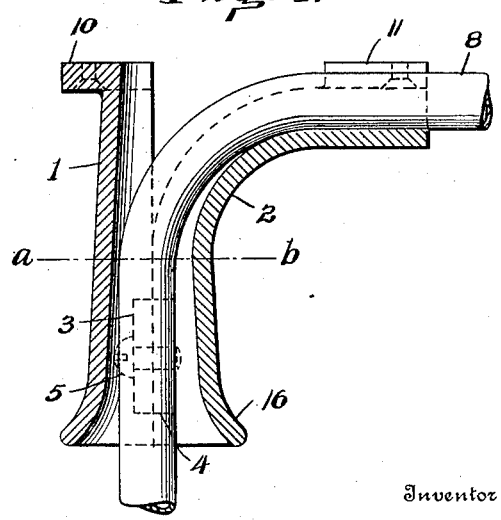
Witnesses
Laura Kleinfelder
Daniel Webster, Jr.
Inventor
William W. Griffiths
By Wm. C. Strawbridge
Attorney

UNITED STATES PATENT OFFICE.

WILLIAM U. GRIFFITHS, OF PHILADELPHIA, PENNSYLVANIA.

CEILING-BEND FOR SUPPORTING PIPES.

967,902.

Specification of Letters Patent.   Patented Aug. 23, 1910.

Application filed May 17, 1907.   Serial No. 374,194.

*To all whom it may concern:*

Be it known that I, WILLIAM U. GRIFFITHS, a citizen of the United States, residing in the city and county of Philadelphia, State of Pennsylvania, have invented certain new and useful Improvements in Ceiling-Bends for Supporting Pipes, of which the following is a specification.

My invention relates to an improvement in ceiling bends or pipe hangers for supporting pipes and it has for its object to provide a device of this character which will satisfactorily support a pipe from a ceiling or other similar point and which will permit an end of the said pipe, usually a lower or depending end, to be connected and disconnected from an object.

It is customary to locate receptacles containing beverages, such as beer, in a cool room, usually a cellar, and connect a pipe to such receptacles and extend the same to an upper room to a spigot through which the beverage is drawn. In such case, a ceiling bend for supporting the pipe is connected to the ceiling or some other suitable supporting medium, the lower end of the pipe being connected and disconnected from the receptacle as the latter is changed, in order to replenish the supply of the beverage. It is desirable, therefore, that means should be provided to permit lateral movement of the pipe in order to prevent kinking or breaking of the same. This desirable result is accomplished by my invention, a convenient embodiment of which is disclosed in the accompanying drawings, but it is to be understood that various changes in the details of construction may be made without departing from the scope of my invention.

In the drawings,—Figure 1 is a side elevation of a ceiling bend embodying my invention, a pipe being shown as supported by the said ceiling bend, and the latter being connected to a suitable support, such as the ceiling of a room; Fig. 2 is a top plan view of my ceiling bend; Fig. 3 is an elevation looking to the right in Fig. 1; and Fig. 4 is a section on the line 4—4 of Fig. 2.

Referring to the drawings, it will be observed that my ceiling bend is composed of two parts or sections 1 and 2, which are provided, respectively, with ears 3 and 4. The ears upon one of the said parts or sections are provided with screw-threaded holes for the reception of screws 5, which extend through slots 6 in the ears upon the other of the said parts or sections. As illustrated, the screw-threaded openings are shown in the ears upon the section 2, while the slots or openings through which the screws pass are secured upon the part or section 1, but it must be understood that this construction may be reversed. The part or section 2 is curved, as indicated in the drawings, so as to provide a suitable seat or support for the pipe 8, one end of which is adapted to be connected in any suitable manner to a receptacle containing the beverage which is to be forced through the pipe to the other end thereof where it is drawn.

In order to provide means for securing the device to a ceiling or other support, the sections 1 and 2 are provided with laterally extending ears or flanges 10 and 11, which are provided with openings 12 and 13, through which screws 14 pass, the said screws being in engagement with the material 15 of the supporting medium.

The material of the lower ends of the semi-circular sections 1 and 2 is flared outwardly, as indicated at 16 in the drawings. It will also be observed that the diameter of the tubular portion or section of the device gradually increases from about the line *a—b* downwardly toward the lower end. By reason of this fact and the further fact that the extreme lower or outer end is flared in the manner particularly indicated in Fig. 4 of the drawings, the lower end of the pipe 8, or rather the end thereof which is to be connected to the receptacle, is permitted to be moved laterally in all directions with but little or no bending. It will also be observed from Figs. 1 and 4 of the drawings, that the curvature of the section 2 of the pipe provides a continuous seat or bearing for the pipe and this supports it in such manner that it is prevented from bending sharply at any one point, and is also prevented from kinking and from flattening out.

Although the device is shown as being composed of two parts 1 and 2, it will be understood that if found to be desirable, the said parts may be constructed integrally. Such a construction would be just as satisfactory and just as effective in use as if constructed in the manner shown in the drawings, but it is not thought that such construction could be so readily and satisfactorily manufactured. It should also be understood that the lower connected ends of the parts 1 and 2 need not, when connected, be tubular in cross section, but may be of any other outline or contour which may be found desirable and practicable.

Having thus described my invention, I claim:—

1. A pipe supporting device having a portion provided with an opening which is larger at its lower than at its upper end, and the said device also comprising a curvilinear portion which extends upwardly and angularly from the upper end of the portion which is provided with the said opening, the said curvilinear portion being adapted to support a pipe or similar object which extends through the said opening, and the enlarged lower end of the said opening permitting freedom of movement of said pipe or similar object in lateral directions.

2. A device of the character described having a portion provided with a tapered opening and a portion which is extended angularly from the said first-named portion to form a support and seat for a pipe and another portion of the said device extended from the said first-named portion, the said two second-named portions being angularly related to each other and adapted to be connected to a suitable supporting medium.

3. A device of the character described comprising two parts and means for connecting the said two parts together, portions of the said two parts when connected together constituting a tubular section one end of which is flared outwardly and one of the first-named parts being curved and extended laterally of the said tubular section to form a seat for a pipe extending through the said tubular section, and means for connecting the said device to a supporting medium.

4. A device of the character described consisting of two parts, means for securing the said two parts together, portions of the said parts after being secured together constituting a tubular section, one end of said tubular section being flared outwardly and one of the said parts being curved and extended at an angle to the said tubular section to form a seat for a pipe extending through the tubular section and the other of said parts extending rectilinearly, and means upon the said extended portions for connecting the said device to a suitable supporting medium.

5. The combination of a pipe supporting device having a tubular section, a curvilinear portion connected to the upper end of and extending angularly from the said tubular section, and a pipe extending through the said device, the said pipe being bent to conform substantially to the said curvilinear portion, and the lower end of the said tubular section being flared outwardly so that the depending portion of the said pipe is movable within the said tubular section in all directions laterally, and means for connecting the said device to a supporting medium.

6. The combination of a pipe and a device of the character described, the said device comprising a section provided with an opening through which the said pipe passes, the said opening having a cross sectional area of any desired contour and the diameter of the said opening being greater than the diameter of the said pipe, whereby the said pipe may be moved in all directions laterally in the said opening, and the said device also comprising a portion which is connected to and is extended angularly from one end of the said section to form a seat for the said pipe or similar object which is extended through the said opening.

7. A device of the character described having a portion provided with an opening and a second portion extended angularly of the said first-named portion to form a support and seat for a pipe which extends through the said opening and the diameter of which opening is larger at its lower than at its upper end so that a portion of the said pipe in the region of the enlarged lower end may be moved in all directions laterally, and means for connecting the said device to a suitable supporting medium.

In testimony that I claim the foregoing as my invention, I have hereunto signed my name this 15th day of May, 1907.

WILLIAM U. GRIFFITHS.

Witnesses:
 IRVIN SHUPP, Jr.,
 LAURA KLEINFELDER.